Feb. 21, 1967

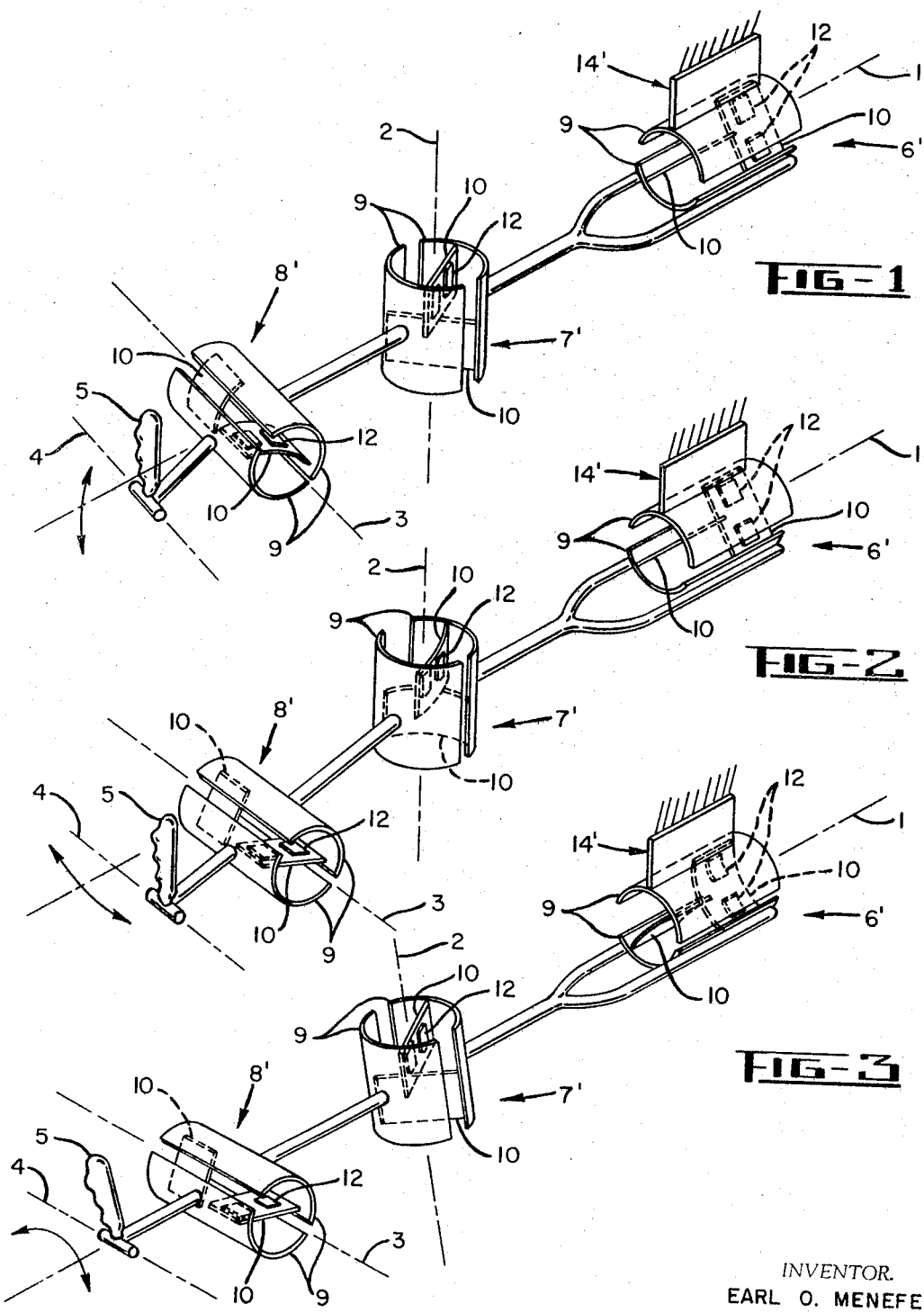

E. O. MENEFEE 3,304,799

PROPORTIONAL CONTROLLER

Filed Feb. 5, 1965

INVENTOR.
EARL O. MENEFEE

BY
ATTORNEYS

INVENTOR.
EARL O. MENEFEE

Feb. 21, 1967

E. O. MENEFEE 3,304,799

PROPORTIONAL CONTROLLER

Filed Feb. 5, 1965

INVENTOR.
EARL O. MENEFEE

BY *[signatures]*
ATTORNEYS

Feb. 21, 1967  E. O. MENEFEE  3,304,799
PROPORTIONAL CONTROLLER
Filed Feb. 5. 1965  8 Sheets-Sheet 5

INVENTOR.
EARL O. MENEFEE
BY
ATTORNEYS

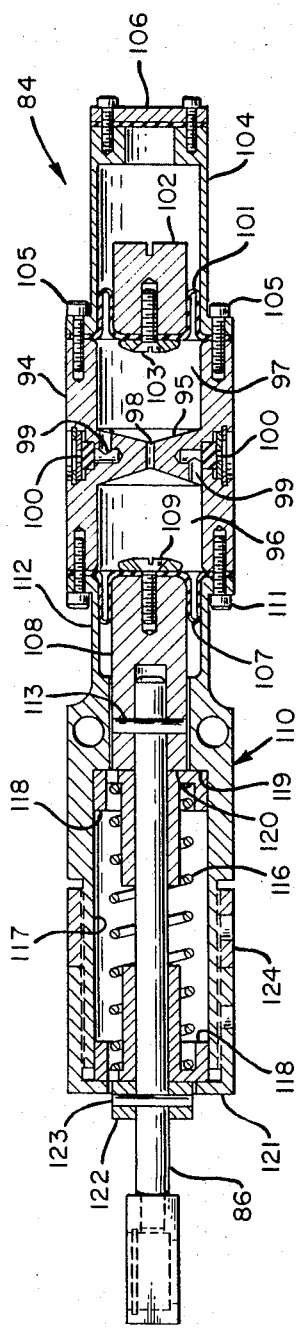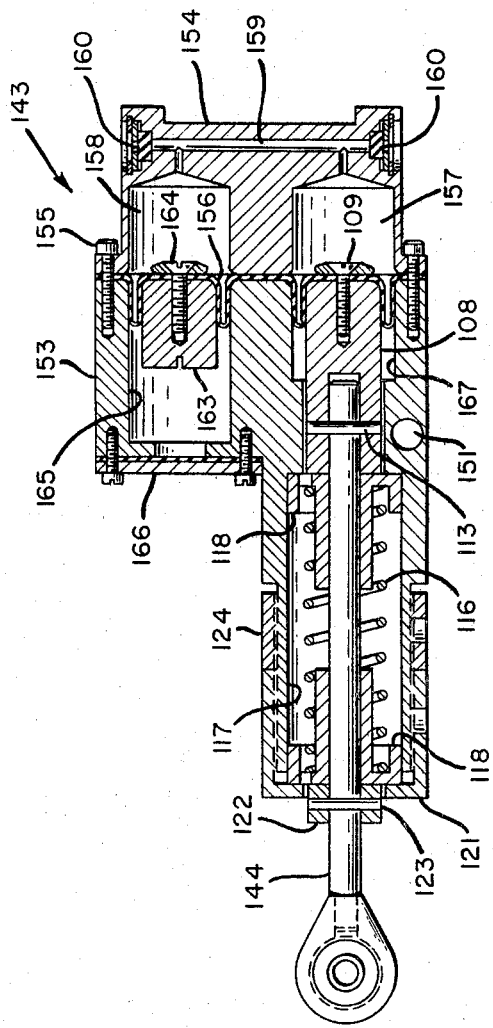

Feb. 21, 1967  E. O. MENEFEE  3,304,799
PROPORTIONAL CONTROLLER
Filed Feb. 5, 1965  8 Sheets-Sheet
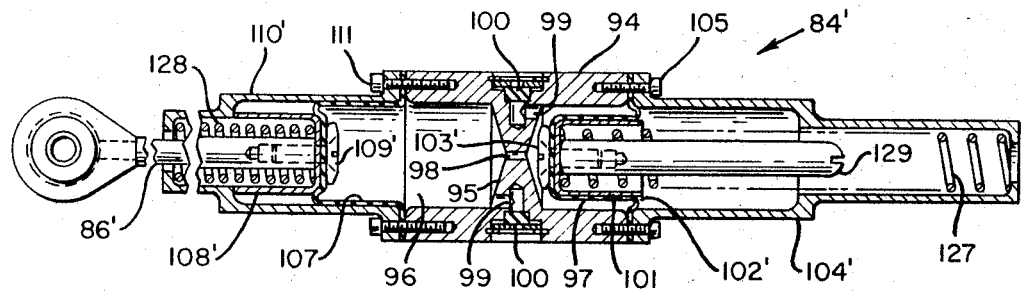
FIG-15
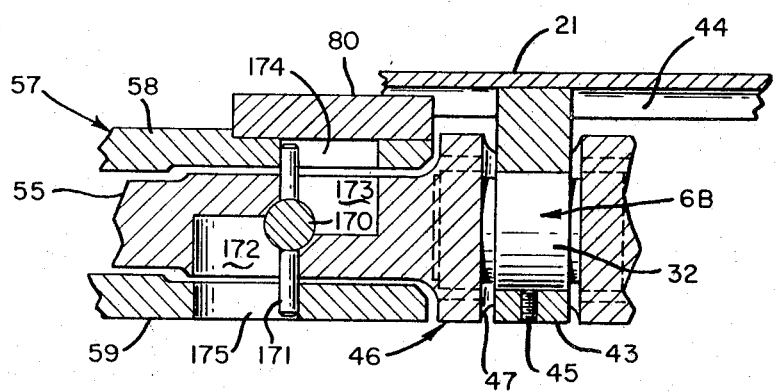
FIG-16
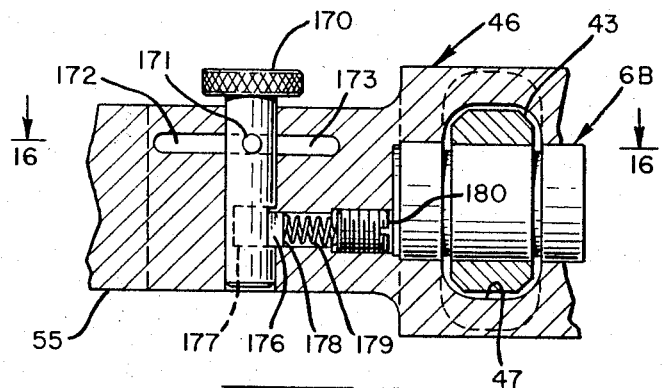
FIG-17
INVENTOR.
EARL O. MENEFEE
BY
ATTORNEYS

# United States Patent Office 3,304,799
Patented Feb. 21, 1967

3,304,799
PROPORTIONAL CONTROLLER
Earl O. Menefee, Mountain View, Calif., assignor to the United States of America as represented by the Administrator of the National Aeronautics and Space Administration
Filed Feb. 5, 1965, Ser. No. 430,776
20 Claims. (Cl. 74—519)

The invention described herein may be manufactured and used by or for the Government of the United States of America for governmental purposes without the payment of any royalties thereon or therefor.

This invention relates to the field of remote controls, and more particularly to a controller for controlling motion about three axes.

The controller according to the invention is designed primarily for use as a side arm controller in air or space craft. Three-degree side arm controllers have already been proposed in connection with space craft, and a substantial amount of development has already been accomplished. However, prior designs have not been completely successful in all aspects.

For example, controllers existing prior to this invention have involved a substantial amount of friction in translating the operators motion of the handle of the controller into an electrical impulse which will cause the desired ultimate control action. For example, it is conventional to employ ordinary bearings for pivotally supporting the handle of the controller for movement about its various control axes and to transmit such movement through gears and adjustable potentiometers to generate the desired electrical signal. The friction which is inherent in the described type of conventional system results in an inherently stiff controller which does not have the desired degree of delicate response. The relatively large amount of friction in existing controllers also results in an undesirable high breakout force. In other words it is desirable for a controller to have a hands-off centered position for the handle. Springs are required to move the handle to its centered position, and if such springs must be sufficiently strong to overcome substantial friction in the system they will likewise present a strong force which must be overcome in moving handle away from its centered position. The force required to move the handle away from its centered position is called the breakout force.

One of the objects of the present invention is to provide an improved controller having substantially reduced friction.

A related object of the invention is to provide an improved controller in which the need for gearing and potentiometers is eliminated. More specifically an object of the invention is to provide an arrangement wherein a conventional bearing, gearing, and potentiometer system can be replaced by one using flexural pivots and strain gages.

One conventional prior arrangement for centering the handle on the controller involves a pair of identical coiled leaf springs operating in opposite directions. Controllers which are centered in this manner have been found to have an inexact centering characteristic. In other words, springs arranged in this manner exhibit a hysteresis condition whereby they do not always return the handle to the exact centered position. As a result it is necessary to provide the associated electrical circuitry with a deadband correction so that the controller will not generate an unintended signal when it does not maintain the exact centered position.

Accordingly it is a further object of the present invention to provide a controller in which substantially exact centering is provided and yet no positive centering force such as a detent is required.

An additional object of this invention is to provide a controller of the type in which the operator's forearm is strapped down and the control motion is delivered entirely by the operator's hand wherein the arrangement of the various pivot axes is improved to provide a handle motion which is more perfectly compatible with the operator's hand motion. More specifically an object of the invention is to provide an arrangement wherein the roll axis is the primary axis; that is, the axis which is attached to the stationary frame.

Another object of the invention is to provide a controller of the type in which the handle has a non-controlling pivotal connection to the controlling pivotal portions of the device. Such additional pivot movement of the handle is provided solely for the purpose of conforming the handle motion to that of the operator's hand. In conventional arrangements of this type the handle is spring centered about the non-controlling pivot axis. It has been found according to the invention that if such a handle is joggled inadvertently, a cyclic motion can be imposed about one of the operating pivot axes. Accordingly, a further object of the invention is to provide a controller of the type described wherein the susceptibility to undesired cyclic motion is eliminated.

A further object of the invention is to provide a multiple axis controller having improved means for locking out the control action about one of the axes.

An additional object of the invention is to provide a controller having the improvements hereinbefore described and yet being relatively simple and inexpensive to manufacture, light in weight, and small in overall dimensions.

By way of brief description a controller according to the invention comprises a support frame and a handle. The handle is connected to the support frame by means of three flexural pivot members. Each of the flexural pivot members comprises two attachment sections and a flexural member interconnecting the attachment sections. One of the pivot members is connected to the support frame and the center line of its flexural member provides the roll axis. Another of the pivot members is connected to the first pivot member and its flexural member provides the yaw axis. A third one of the pivot members is connected to the second pivot member and its flexural member provides the pitch axis. The handle is connected to the third pivot member by means of a fourth pivot axis which is parallel to the pitch axis. It is the fourth axis which is the non-controlling axis included solely for the purpose of more perfectly matching the movement of an operator's hand when his forearm is held immobile. A strain gage or equivalent electrical device for detecting bending is attached to each of the flexural members to provide the desired electrical signal. The signals from the strain gages are delivered to conventional circuitry which does not form part of the present invention, and which translates the signals into the desired movement of control mechanisms such as ailerons and rudders or jet motors. The electrical signals from the strain gages, and the resulting control movements are of course proportional to the amount of movement of the handle.

Additional objects and features of advantage will become apparent from the following detailed description wherein reference is made to the accompanying drawings in which:

FIGURE 1 is a schematic perspective view providing an overall concept of the arrangement and operation of the entire controller, and showing the handle motion to obtain pitch control. For example, the handle is shown pushed downwardly from its centered position;

FIGURE 2 is a schematic perspective view similar to FIG. 1 but showing the handle motion to obtain yaw control. By way of example the handle is shown pushed to the right from its centered position;

FIGURE 3 is a schematic perspective view similar to FIG. 1 but showing the handle motion to obtain roll control. By way of example, the handle is shown rotated clockwise as viewed from the right end of the arrangement shown in FIG. 3;

FIGURE 13 is an enlarged sectional view taken on the line 13—13 of FIG. 4 and showing the centering and damping means for the pitch axis;

FIGURE 14 is an enlarged sectional view taken on the line 14—14 of FIG. 5 and showing the centering and damping means for the roll axis;

FIGURE 15 is a cross sectional view similar to FIGURE 13 but showing a modified arrangement for damping the motion about the various axes. In the modification of FIGURE 15 there is zero breakout force, but the centering action is not as positive as in the embodiment of FIG. 13.

FIGURE 16 is a cross sectional view taken on the line 16—16 of FIG. 17 and showing means for locking out control about the yaw axis;

FIGURE 17 is a cross sectional view on enlarged scale showing the lock out mechanism and taken on line 17—17 of FIG. 4.

Figure 4:
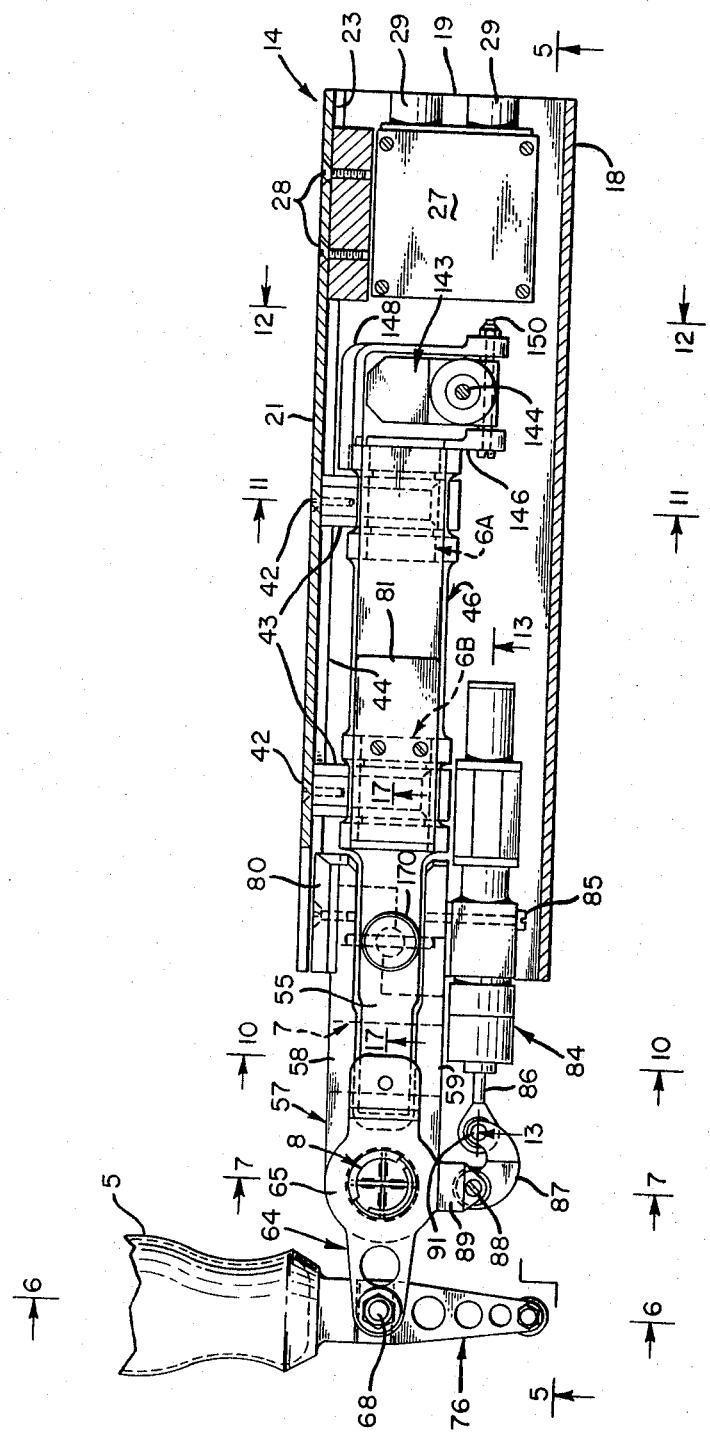
FIGURE 4 is a vertical sectional view through the longitudinal axis of the controller frame and showing most of the internal parts in elevation.

Detailed reference will now be made to the drawings starting with FIGS. 1–3. As depicted schematically in FIGS. 1–3 of the drawings, the controller comprises a mechanism providing four pivot axes numbered 1–4. A handle 5 is supported for pivotal movement about said axes. In one specific use for which the apparatus is intended, axis 1 is the roll axis, axis 2 is the yaw axis, and axis 3 is the pitch axis. The only purpose of axis 4 is to accommodate the complex motion of an operator's hand when he tries to move handle 5 about axis 3 with the impediment of having his forearm held in a fixed position above and parallel to axis 1.

The roll, yaw and pitch axes are formed by pivot members 6′, 7′ and 8′, respectively. The reason for using primed reference numbers is that the preferred actual pivot members are somewhat more sophisticated and will be designated 6, 7 and 8 later in the description in order to maintain easy comparison with the simplified schematic representation in FIGS. 1–3. Each of the pivot members comprises two attachment sections 9 and a pair of interconnecting flexure webs 10. The flexure webs 10 are arranged at right angles to each other in each pivot member and the midpoints of the two flexure webs for each pivot member cooperate to form the pivot axis for their respective pivot member. For example, the flexural webs 10 of pivot member 6 cooperate to form the pivot axis 1. The flexural member 6′ is attached to a mounting frame 14′, and the pivot members 7′ and 8′ are supported from the pivot member 6′. Flexural pivots per se are not claimed as new in this application.

In order to use flexural pivots to form not only the pivot axes but also to provide in simple manner a means for transmitting motion about such axes, the flexural webs 10 are provided with members which are responsive to bending. For example, one of the flexural webs 10 in each of the pivot members is equipped with conventional strain gage strips 12. As will be hereinafter described in more detail in connection with FIGS. 8 and 9, the strips 12 are employed on only one of the flexural webs for each pivot member but a plurality of strain gages is employed in connection with each of the selected flexural webs. As will be understood by those skilled in the art the strain gages can be wired into conventional electrical systems which will generate electrical output for control purposes which is precisely proportional to the amount of bending of the strain gages.

As will now be apparent from the preceding description, the movement of handle 5 about axis 3 as depicted in FIG. 1 will bend the flexural members 10 of pivot member 8′ and therefore will bend the strain gages 12 to actuate the movement of some remote member such as the pitch control of a space craft. As depicted in FIG. 2 movement of the handle about the pivot axis 2 will bend the strain gages 12 on pivot member 7′ to cause actuation of a remote member such as the yaw control of a space craft. As depicted in FIG. 3, movement of the handle about the pivot axis 1 will cause bending of the strain gages 12 on pivot member 6′ to cause actuation of a remote member such as the roll control of a space craft. Although operation of the apparatus has been described with reference to separate movement about the three axes 1–3, it will be obvious to those skilled in the art that the handle can be moved in any direction to combine movement about any two or more of the axes 1–3.

An actual structural embodiment of the invention will now be described with reference to FIGS. 4–17. The actual apparatus comprises a support frame 14 in shape of a rectangular channel. Frame 14 is made in two pieces, a U-shaped piece forming a bottom wall 18 and two side walls 19 and 20, and a flat piece forming a top wall 21. The upper ends of the side walls 19 and 20 are bent over to form flanges 22 and 23 on which the top 21 is mounted by means of connectors 24. It has been found convenient to house part of the conventional electrical components in boxes 25, 26 and 27, and attach these boxes to the underside of the top of the support frame by screws 28. Each of the component's boxes individually serves one of the pivot members and is provided with a pair of cable sockets 29 at its right end to accommodate electrical connections to and from the strain gages on its respective pivot member.

Figure 8:
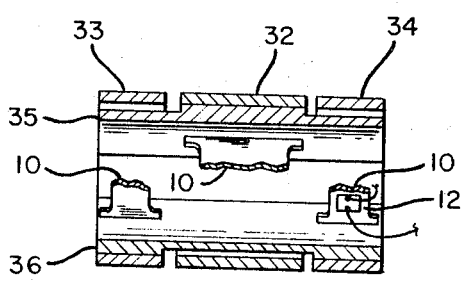
FIGURE 8 is a cross sectional view of the flexural pivot member of FIG. 7.
Figure 9:
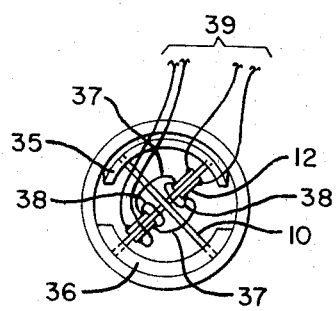
FIGURE 9 is an end view of the flexural pivot member of FIG. 8.
Figure 10:
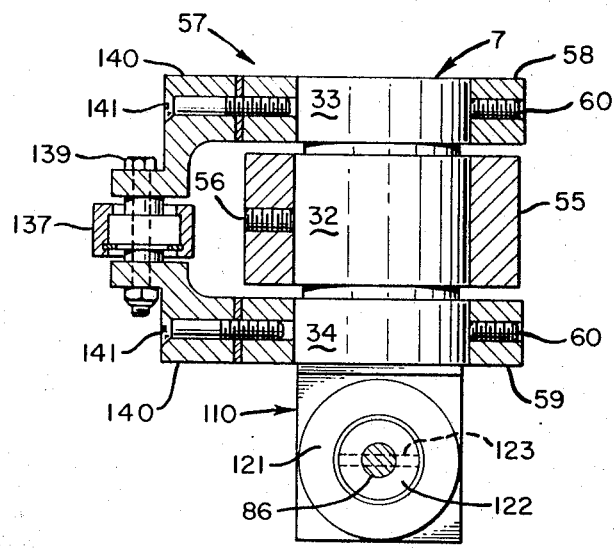
FIGURE 10 is a cross sectional view on enlarged scale through the yaw axis taken on line 10—10 of FIG. 4, and showing the flexural pivot member of the yaw axis in elevation.

In the actual device the roll pivot member 6′ is in the form of two pivot members 6A and 6B. The yaw pivot member 7′ is in the form of a pivot member 7, and the pitch pivot member 8′ is in the form of a pivot member 8. The pivot members 6A, 6B, 7 and 8 are all identical structures. The details of a preferred pivot member structure are shown in FIGS. 8 and 9 in which it will be seen that each of the pivot members comprises three cylindrical attachment sections, a center section 32 and end sections 33 and 34. A semi-cylindrical inner section 35 is brazed to the middle section 32 and a semi-cylindrical inner section 36 is brazed to the end sections 33 and 34. The inner section 35 has a reduced diameter adjacent its opposite ends so that it is spaced from the end sections 33 and 34.

Similarly the inner section 36 has a smaller diameter periphery on its middle portion so that it is spaced from the center section 32. Thus the center cylinder 32 and the inner section 35 are free to rotate as a unit relative to the end cylinders 33 and 34. Similarly cylinders 33 and 34 are joined with the inner section 36 to form a unit which is free to rotate relative to the center cylinder 32 and the inner section 35. Three flexure webs 10 are employed with the two end webs being aligned and the center web being arranged at right angles thereto. In each case one end of the web is attached to the inner member 36 and the other end of the web is attached to the inner member 35.

Two strain gages 12 are preferably mounted on each side of one of the end flexure members and are spaced apart to provide individual flexure responsive elements. One possible arrangement for the strain gages, a Wheatstone bridge circuit, is shown in which the adjacent ends of the strain gages on the same side of web 10 are connected by leads 37, and the adjacent ends of the strain gages on opposite sides of the web are interconnected by leads 38. The other end of each of the strain gages is connected to a lead 39 which goes to the amplifier for the particular flexural pivot member. The same location and wiring of strain gages as is shown in FIGS. 8 and 9 is employed on each of the pivot members 6A, 7 and 8.

Figure 5:
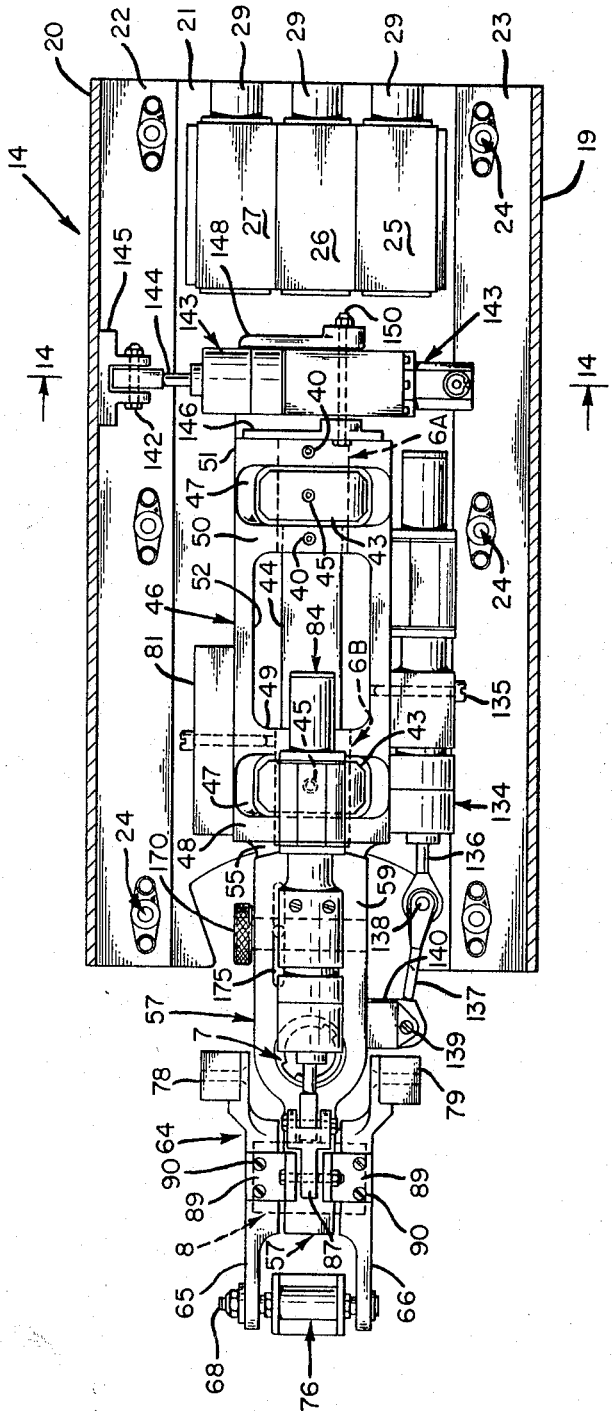
FIGURE 5 is a bottom view of the internal parts of the controller taken on line 5—5 of FIG. 4.

The mounting arrangement for the pivot members 6A and 6B will now be described. An elongated U-shaped post arrangement is suspended from the top wall 21 by screws 42. The U-shaped member comprises two end post members 43 interconnected by a center strip 44. As is shown best in FIGS. 4, 5, 11, 16 and 17, each of the posts 43 is bored to receive the center cylinder 32 of one of the pivot members 6A and 6B. The center sections 32 are held rigidly secured in the posts 43 by means of at least one set screw 45. A roll mounting block 46 is carried by the end cylinders 33 and 34 on the two pivot members 6A and 6B. More specifically the mounting block 46 is provided with two recesses 47 which receive the posts 43. The webs 48–51 of block 46 adjacent the recesses 47 are bored to receive the end cylinders 33 and 34 on the pivot members 6A and 6B as shown best in FIGS. 5 and 17. The end cylinders 33 and 34 of the pivot members 6A and 6B are held rigidly in place in the mounting block 46 by means of at least one set screw 40 for each of the end cylinders, as seen in FIG. 5. It will now be apparent to those skilled in the art that the pivot members 6A and 6B provide the roll axis 1 as indicated schematically in FIGS. 1–3. Each of the pivot members 6A and 6B has its center cylinder 32 rigidly secured to the frame 14 and its end cylinders 33 and 34 rigidly secured to and supporting the roll mounting block 46. Mounting block 46 is made hollow at the portion 52 between the webs 49 and 50 to reduce the weight and to provide access to the pivot member 6B.

The connection between the yaw pivot member 7 and the roll mounting block 46 will now be described. As shown best in FIGS. 4, 5, 10, 16 and 17, the mounting block 46 has a cantilever portion 55 projecting to the left of web 48. The cantilever portion 55 is bored at its left end to receive the yaw pivot member 7. As shown best in FIG. 10, the center cylinder 32 of the pivot member 7 is firmly secured in the cantilever portion 55 by means of a set screw 56. A roughly U-shaped pivot arm member 57 has legs 58 and 59 which are bored to receive the pivot member 7. More specifically, the outer cylinder 33 of pivot member 7 is received in the arm 58 and the outer cylinder 34 is received in the arm 59. The pivot member 7 is held firmly attached to the pivot member 57 by means of set screws 60, as shown best in FIG. 10. Thus, it will now be understood that the center section of pivot member 7 is secured to the roll mounting block 46 and the end sections of pivot member 7 are secured to the yaw pivot arm member 57. Thus, the pivot member 7 provides the yaw axis 2 as indicated schematically in FIGS. 1–3.

The connections between the pitch pivot member 8 and the yaw pivot arm 57 will now be described. The left end or bight portion of the U-shaped pivot arm 57 is bored to receive the pitch pivot 8. More specifically, the center cylinder 32 of pivot member 8 is received in the bored left end of the pivot arm 57 where it is held firmly in place by a set screw 63 as shown best in FIG. 7. A pitch pivot arm structure 64 is made in two pieces 65 and 66. Each of the pieces 65 and 66 is bored to receive the pivot member 8. More specifically, the end cylinders 33 and 34 of pivot member 8 are received in the two side pieces 66 and 65, respectively. Pivot member 8 is held firmly attached to the pivot arm structure 64 by means of set screws 67 as shown best in FIG. 7. It will now be apparent that the pivot member 8 provides the pitch axis 3 as indicated schematically in FIGS. 1–3.

Figure 6:
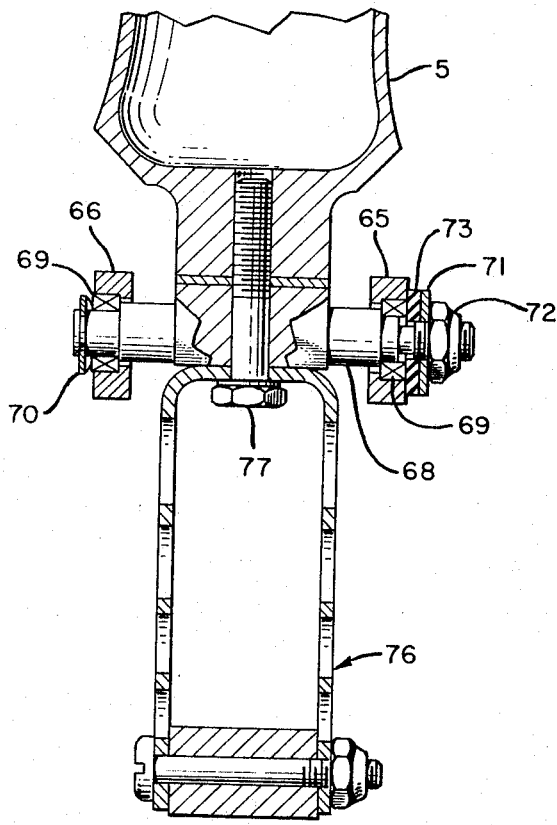
FIGURE 6 is an enlarged cross sectional view of the handle taken on line 6—6 of FIG. 4.
Figure 7:
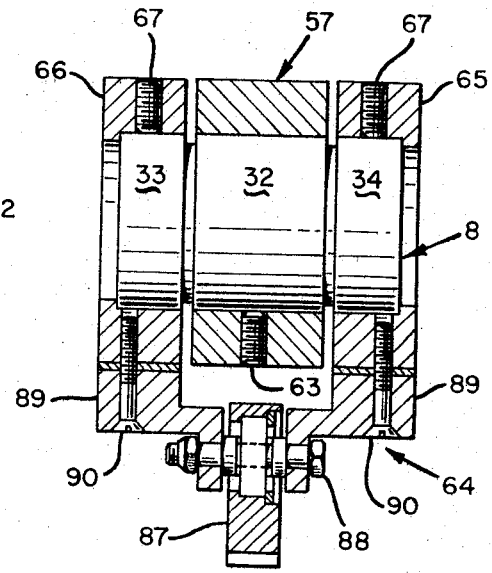
FIGURE 7 is an enlarged cross sectional view through the pitch axis taken on line 7—7 of FIG. 4, and showing the flexural pivot member in elevation.

The left end of the pivot arm structure 64 carries the handle 5 by means of a pivot shaft 68 which is rigidly attached to the handle 5 for movement therewith. Shaft 68 is journalled in bearings 69 in the pivot arm sections 65 and 66. The left end of the shaft 68 as viewed in FIG. 6, is engaged by a snap ring 70 and the right end of the shaft is engaged by a clutch mechanism. More specifically, the clutch mechanism comprises a metal washer 71, a locking nut 72 and a leather clutch ring 73. The leather clutch ring arrangement provides a desirable touch or feel to the controller operation and at the same time damps out unwanted motion of the handle about the pivot shaft 68 which might occur when the controller is joggled.

The controller is specifically designed for use in situations where it will be subjected to substantial acceleration forces from all directions. If the controller were not balanced about each of its pivot axes 1–4, acceleration forces would have the effect of imparting unintended control movement about the various control axes. The counter-balancing structure for each of the axes will now be described. Handle 5 is counterbalanced about the pivot shaft 68 by means of a counterweight structure 76 held in place by a bolt 77. The pitch pivot arm assembly 64 is counterbalanced about the axis of pivot member 8 by means of counterweights 78 and 79. The yaw pivot arm structure 57 and attached structures are counterbalanced about the axis of pivot member 7 by means of a counterweight 80. The roll mounting block 46 together with the elements attached thereto is balanced about the axes of pivot members 6A and 6B by means of a counterweight 81.

In order that the controller will have an automatically centered hands-off position, and in order that motion about the centered position will be damped, centering and damping means are provided about each of the pivot axes 1, 2 and 3. As shown in FIGS. 4, 5 and 13, movement of the handle 5 about the pivot axes formed by the pivot member 8 is controlled by a centering damper structure 84. The centering damper 84 is attached to the lower leg 59 of the pivot arm structure 57 by means of screws 85 so that the structure 84 will move as a unit with its pivot member 8 about the pivot axes formed by the pivot member 7. The pitch pivot arm structure 64 is connected to a damper operating rod 86 by means of a connecting link 87. The link 87 is pivotally connected to the pitch pivot arm structure 64 and is thus actuated by movement of handle 5 about the pivot member 8. The left end of link 87 is held by a pivot bolt 88 secured by a pair of brackets 89 to the pivot arms 65 and 66 by means of screws 90. The right end of link 87 is yoke-shaped and is pivotally connected to the rod 86 by a bolt 91.

The damper portion of the centering damper structure 84 comprises a cylinder 94 having a partition 95 therein to form a pair of damper chambers 96 and 97. The partition wall 95 is provided with a restricted passage 98 to accommodate flow between the chambers 96 and 97. Fill and bleed passages 99 are provided on opposite sides of cylinder 94 and are closed by rubber sealing disks 100. The sealing disks 100 are penetratable by hypodermic needles in order to inject the damping liquid into chambers 96 and 97 and the small hole made by the needle is automatically closed when the needle is removed so that the liquid will not leak out of the chambers 96 and 97. The liquid is injected through the lower disk 100 and air is removed through the upper disk 100. The right end of chamber 97 is closed by a flexible diaphragm 101 attached to a short backing piston 102 by means of a screw 103. A backing cylinder 104 surrounds the piston 102 and has a flanged inner end which is attached by screws 105 to the cylinder 94, with the rim of the diaphragm 101 clamped between the cylinders 94 and 104. It will be apparent to those skilled in the art that as the liquid is forced from chamber 96 into chamber 97 the diaphragm 101 and with it the piston 102 will be forced to the right into cylinder 104. As the diaphragm moves to the right it will peel away from the outer surface of piston 102 and engage a greater length of the inner surface of cylinder 104. The right end of cylinder 104 is closed by a disk 106. The left end of chamber 96 is closed by a diaphragm 107 which is attached to a backing piston 108 by means of a screw 109. A mounting casing 110 is flanged at its right end and attached to the cylinder 94 by screws 111 with the diaphragm 107 clamped between the casing 110 and the cylinder 94. The right end portion 112 of the casing 110 has a cylindrical shape which provides a backing surface for the diaphragm 107. The diaphragm 107 operates in the same manner as diaphragm 101, rolling back and fourth between the backing rod 108 and the inner surface of cylinder 112 in response to axial movement of the operating rod 86. The operating rod 86 is connected to the backing piston 108 by means of a pin 1113.

It will now be apparent to those skilled in the art, that as the handle 5 is moved downward about the pitch axis formed by pivot member 8 as shown in FIG. 4 the actuating rod 86 will move rearwardly to force diaphragm 107 into chamber 96. The liquid in chamber 96 will thus be forced through the restricted passage 98 into chamber 97 and the increase of liquid in chamber 97 will be accommodated by movement of diaphragm 101 to the right. It is the restriction to flow of liquid through the passage 98 that provides the desired damping. Similarly, upward movement of handle 5 about the pitch axis formed by pivot member 8 will cause the operating rod 86 to move to the left and will cause liquid to flow from chamber 97 into chamber 96 through the restricted passage 98.

In order to provide a hands-off position for the handle 5 about the pitch axis formed by pivot member 8, a centering spring 116 is employed. The left end of casing 110 is provided with a large internal recess 117 in which the spring 116 is received. The opposite ends of spring 116 engage a pair of abutment sleeves 118 which are slidingly received on the operating rod 86 in the recess 117. It will be seen that the sleeve 118 on the right is adapted to abut the right end wall 119 of the recess 117 and also the left end 120 of the backing piston 108. Similarly, the sleeve 118 on the left is adapted to abut a closure collar 121 which is threaded on the outside of casing 110. The left abutment sleeve 118 is also adapted to engage an abutment ring 122 which is firmly attached to the rod 86 by pin 123. Collar 121 can be screwed along the casing 110 to obtain the desired degree of compression of spring 116. When the desired position is found, the collar can be locked in place by turning a locking sleeve 124 into engagement with the end of the collar 121.

The centering apparatus which has just been described is shown in its centered position in FIG. 13 and it will tend to restore the parts to such centered position whenever they are displaced therefrom. For example, if handle 5 is moved upward as shown in FIG. 4 about the pitch axis formed by the pivot member 8, the control rod 86 will be moved to the left as viewed in FIG. 13. When the control rod 86 is thus moved to the left, the abutment surface 120 will force the abutment sleeve 118 to the left thereby compressing spring 116. Therefore, when handle 5 is released from its upward position, the spring 116 will force the right sleeve 118 and with it the backing piston 108 to the right until the sleeve 118 abuts the wall 119. When the sleeve 118 does engage the wall 119 the motion will stop and the apparatus will be obviously returned to its centered position. Similarly, when handle 5 is moved downward in FIG. 4 about the axis formed by pivot member 8 the control rod 86 will be moved to the right as viewed in FIG. 13. When the control rod 86 is moved to the right, the abutment ring 122 will force the left sleeve 118 to the right thereby compressing ring 116. When the handle is released from its downward position, the compressed spring 116 will force the left sleeve 118 and with it the abutment ring 122 and operating rod 86 to the left until the sleeve 118 engages the collar 121. When the left abutment sleeve 118 thus engages the collar 121, the movement will cease and the apparatus is obviously returned to its centered position. Obviously the movement caused by spring 116 is damped in the same manner that movement caused by moving the handle is damped.

As will be apparent to those skilled in the art, the spring arrangement shown and described in connection with FIG. 13 provides a positive centering arrangement. In other words, spring 116 is placed under initial compression by screwing the collar 121 along the casing 110. Thus there is a definite force tending to return the operating arm 86 to its centered position and to prevent it from being displaced in either direction from that centered position. However, it should be understood that since there are very low friction forces involved, the prestressed force of spring 116 can be relatively small and yet be sufficient to insure that the handle 5 is always returned to the same centered position about the pivot axis of pivot member 8.

FIG. 15 shows a modified centering damper structure 84' which can be substituted for the centering damper structure 84. Some of the elements of structure 84' are the same as those of structure 84 and others are similar but modified slightly. Identical reference numerals will be used to identify parts which are exactly the same and primed reference numerals will be employed to identify parts which are similar. The structure 84' comprises a cylinder 94 having a partition 95 forming chambers 96 and 97 separated by the restricted passage 98. The fill passages 99 are closed by sealing disks 100. The right diaphragm 101 is attached to a backing cup 102' by means of a screw 103'. A backing cylinder 104' is flanged at its left end and is attached to the casing 94 by means of screws 105 with diaphragm 101 clamped between the cylinder 104' and the casing 94. The left diaphragm 107 is attached to a backing cup 108' by means of a screw 109'. A casing 110' is flanged at its right end and attached to the casing 94 by means of screws 111, with the diaphragm 107 clamped between the casing 110' and the cylinder 94. The portion of the apparatus shown in FIG. 15 which has thus far been described is the fluid damping portion which operates exactly the same as the fluid damping portion of the apparatus shown in FIG. 13.

The means for spring biasing the apparatus 84' toward a center position is somewhat different than the centering means of the apparatus shown in FIG. 13. In apparatus 84' of FIG. 15 each of the diaphragms is urged toward the center of the apparatus by means of springs 127 and 128, respectively. The right end of spring 127 engages the right end of cylinder 104' and the left end of spring 127 engages the cup 102'. A stabilizing rod 129 is positioned inside the spring 127 and is held in place by the screw 103'. Similarly, the left end of spring 128 engages the left end of casing 110' and the right end of spring 128 engages the cup 108'. In the embodiment of FIG. 15, the cylinder 104' on the right end has exactly the same shape and size as the casing 110' on the left end. Spring 128 is also provided with the stabilizing and operating rod 86' which is held in place by the screw 109'. The centering mechanism of the centering damper structure 84' is shown in FIG. 15 with the operating rod 86' at its left limit of travel corresponding to the limit of upward movement of handle 5 as viewed in FIG. 4. When the handle is released from such an upward position, the tightly compressed spring 128 will force the operating rod 86' and handle 5 toward a centered position in which the diaphragms 101 and 107 are equally spaced from the partition 95 as is the case in FIG. 13. Similarly, if handle 5 is moved downward as viewed in FIG. 4, the operating rod 86' will be forced to the right as viewed in FIG. 15 and will cause the spring 127 to be tightly compressed.

The main difference between the embodiments of FIGS. 13 and 15 is that the embodiment of FIG. 13 contains a much more positive centering action because as previously explained the spring 116 is prestressed to resist movement of operating rod 86 in either direction by causing the sleeves 118 to abut the wall 119 and the collar 121. When the parts in FIG. 15 are in their centered position, the springs 127 and 128 can be prestressed but the difference is that they are operating against each other. As a result, an appreciable distance of movement away from the centered position is required before an appreciable composite spring restoring force is developed. In order to be effective to center the parts, the composite force must be great enough to overcome any residual friction inherent in the apparatus, plus the effect of spring hysteresis. The embodiment of FIG. 13 is required when a positive centering arrangement is desired. The embodiment of FIG. 15 is preferred when positive centering is not required and it is desired that there be substantially no breakout force required to move from the centered position.

Figure 11:
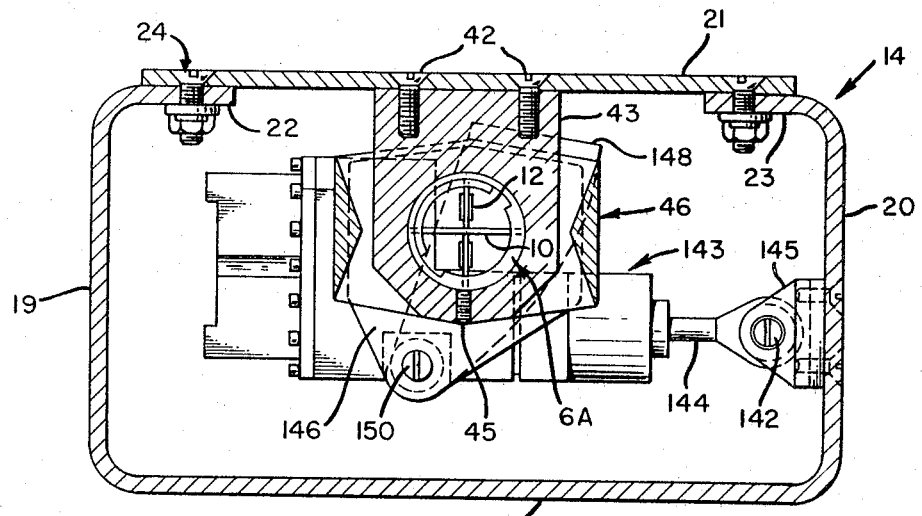
FIGURE 11 is a cross sectional view on enlarged scale taken on line 11—11 of FIG. 4 and showing a view through one of the two flexural pivot members which form the roll axis.
Figure 12:
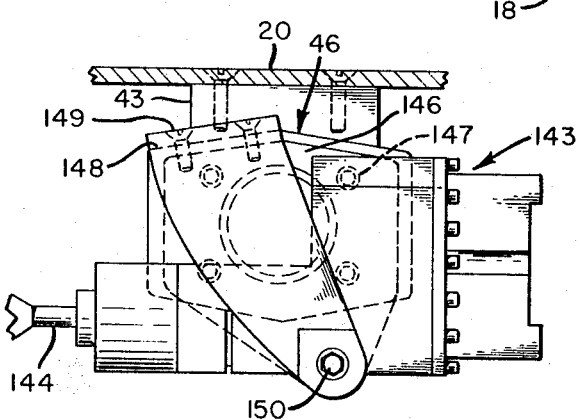
FIGURE 12 is an enlarged view taken on the line 12—12 of FIG. 4.
Figure 18:
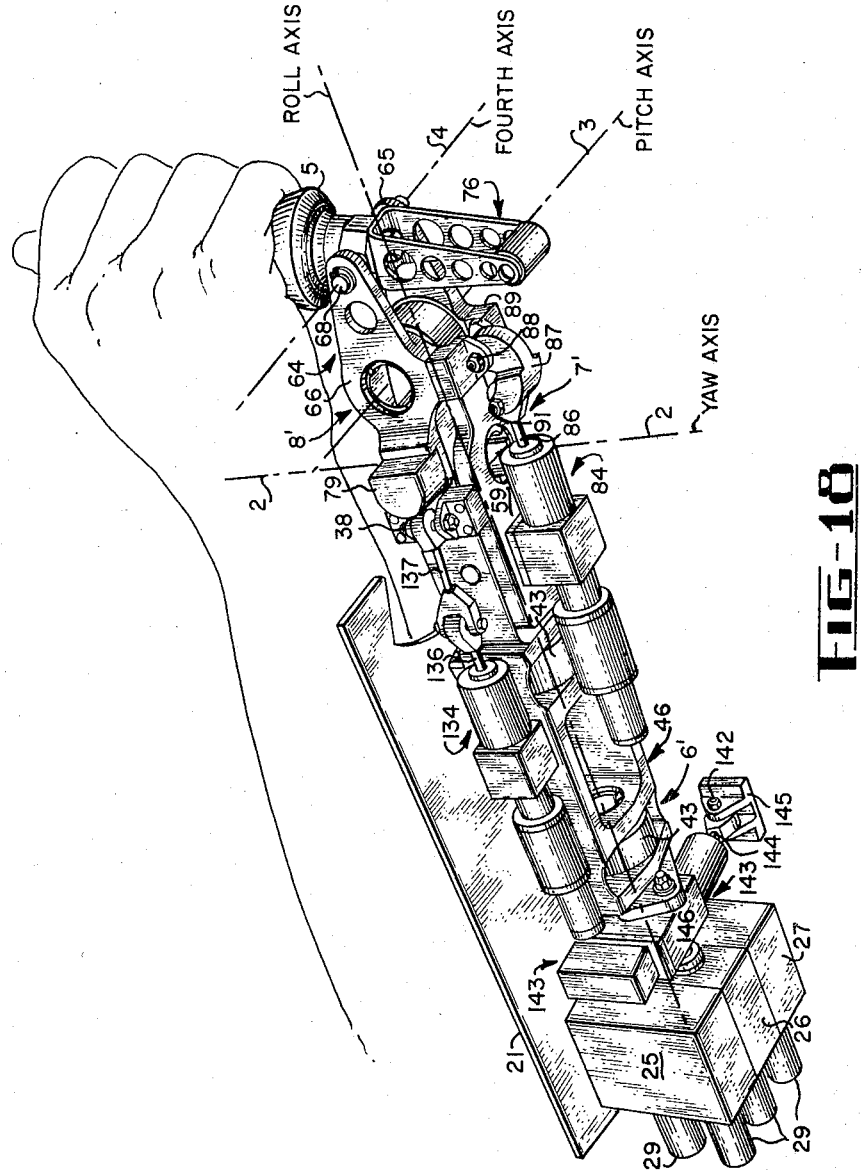
FIGURE 18 is a perspective view of the controller, showing each axis and the four pivot members.

The means for centering and damping the motion about the pitch pivot axis have just been described. The means for centering and damping the motion about the yaw pivot axis formed by the pivot member 7 will now be described. As shown in FIGS. 5 and 11, a centering and damping construction 134 is attached to the roll mounting plate 46 by screws 135. The centering damper 134 has an operating rod 136. Since the centering damper 134 is attached to the mounting block 46, it will move with the pivot member 7 about the pivot axis formed by the pivot members 6A and 6B. However, the arrangement is such that when the handle 5 is moved about the yaw axis formed by pivot member 7, the operating rod 136 will be caused to be moved in and out of the centering pivot construction 134. Such movement of the handle is transmitted to the operating rod 136 through a connecting link 137. The right end of link 137 is connected to the operating rod 136 by means of a pivot bolt 138. The left end of link 137 is held by a pivot bolt 139 which interconnects a pair of brackets 140. The brackets 140 are connected by screws 141 to the legs 58 and 59 of the U-shaped yaw pivot arm 57. The centering damper structure 134 is identical to the centering damper structure 84 and operates to center and dampen the motion about the yaw pivot axis in exactly the same manner that the centering damper structure 84 operates to center and damp the motion about the pitch pivot axis. The centering damper structure 134 is replaceable by the centering damper structure 84' in the same way that the centering damper structure 84 is replaceable by the centering damper structure 84'.

Means for centering and damping the motion around the pivot axes formed by the pivot members 7 and 8 have been described, and now the means for centering and damping the motion about the pivot axis formed by the pivot members 6A and 6B will be described. A centering damper structure 143 controls the motion about the roll axis. Centering damper structure 143 is mounted on the roll mounting block 46, and a control rod 144 is pivotally attached to the frame side 20 by means of a pivot bolt 142 and a bracket 145. The details of the centering damper structure 143 and its mounting arrangements are shown best in FIGS. 4, 5, 11, 12 and 14. A mounting bracket 146 is attached to the right end of the mounting body 46 by means of screws 147. A second mounting bracket 148 is attached to the top of the mounting body 46 by means of screws 149. The two mounting brackets 146 and 148 are drilled on a common axis to receive a bearing bolt 150 that passes through a bore 151 in the centering damper 143 to pivotally support the same on the mounting block 46.

The detailed construction of the centering damper 143 is shown in FIG. 14 wherein it will be seen that the centering mechanism is substantially identical to that of the centering damper 84. In order to avoid repetition, the parts of the centering mechanism with are identical in FIGS. 14 and 13 will be given the same reference numerals, and reference is made to the description of the centering operation given in connection with FIG. 13. The centering damper structure 143 has a main casing 153. A cooperating casing 154 is connected to casing 153 by screws 155 and a diaphragm 156 is clamped between the casing 153 and 154. The casings and diaphragm form a pair of chambers 157 and 158 interconnected by a restricted passageway system 159. As shown in the drawings diaphragm 156 is a one piece unit, but it can of course be made in two separate pieces, one for each of the chambers 157 and 158. As in the case of the centering damper 84, rubber sealing disks are employed for use in connection with a hypodermic needle in loading the chambers 157 and 158 with hydraulic liquid. The portion of diaphragm 156 which forms chamber 158 is provided with a short backing piston 163 held in place by screw 164. Backing piston 163 is located in a cylindrical recess 165 in casing 153 which forms a backing wall for part of the diaphragm 156. The left end of recess 165 is closed by a plate 166. The casing 153 also contains a recess 167 which provides a cylindrical backing wall for the portion of diaphragm 156 that cooperates with chamber 157. The left end of casing 153 provides the recess 117 in which the spring 116 is located. The centering damper construction 143 of FIG. 14 operates in substantially the same manner as the centering damper structure 84 of FIG. 13. Basically the only difference between the two structures is that the chambers 96 and 97 in FIG. 13 are arranged coaxial and the chambers 157 and 158 in FIG. 14 are in side by side arrangement. The two different arrangements are employed to accommodate the two different shapes of space available for the particular centering dampers and the differences in shape do not involve any differences in operation. Thus it will be understood by those skilled in the art that when the handle 5 is rocked sideways about the roll axis formed by the pivot members 6A and 6B, the centering damper 143 will be rocked about the roll axis to cause the control rod 144 to move in and out of the centering damper. The centering and damping action is exactly the same as was described in connection with the centering damper 84 of FIG. 13.

It is sometimes desirable to lock out the control about the yaw axis, and the arrangement for accomplishing this purpose will now be described. As shown best in FIGS. 4, 5, 16 and 17 the lockout arrangement comprises a lockout post 170 rotatably journalled in the left portion 55 of the mounting block 46. A locking pin 171 is carried by the post 170. The mounting body portion 55 is provided with recesses 172 and 173 in which the pin 171 can be received by rotating the post 170 clockwise as viewed in FIG. 16. The arms 58 and 59 of the yaw pivot arm structure 57 are provided with slots 174 and 175, respectively, into which the ends of the pivot pin 171 can be moved as shown in FIG. 16. In order for handle 5 to be moved about the yaw axis formed by pivot member 7 the arms 58 and 59 of the pivot arm structure 57 must be free to oscillate across the sides of the left portion 55 of the mounting block 46. However, when the post 170 is turned to the position shown in FIG. 16 so that the ends of the pin 171 are engaged in the slots 174 and 175, the yaw pivot arm structure 57 cannot move with respect to the mounting body 46. In this way the control about the yaw axis can be easily and quickly locked out. Control about the yaw axis is just as easily and quickly restored by simply turning the post 170 clockwise as viewed in FIG. 16 until the ends of the pin 171 are removed from the slots 174 and 175 and are positioned in the recesses 172 and 173 in the mounting body portion 55. In order to hold the control post 170 in either of its two extreme rotational positions it is provided with two flats 176 and 177 arranged at 90° to each other, and an engagement block 178 is pressed against one or the other of the flats by means of a spring 179 held in place by a screw 180.

Although specific details of the present invention are shown and described herein, it is to be understood that modifications may be made therein without departing from the spirit and scope of the invention as set forth in the appended claims.

Having thus described the invention, what is claimed as new and desired to be secured by Letters Patent is:

1. A controller comprising a support frame and a handle, first and second pivot members each comprising two attachment sections and a flexural member interconnecting said attachment sections, said two attachment sections of said first pivot member being disposed on a first pivot axis and said two attachment sections of said second pivot member being disposed on a second pivot axis which is perpendicular to said first pivot axis, means rigidly connecting one of said attachment sections of said first pivot member to said frame, means connecting one of said attachment sections of said second pivot member to the other attachment section of said first pivot member, and means connecting said handle to the other attachment section of said second pivot member, one of said attachment sections of said first pivot member being movable relative to the other of said sections in response to movement of said handle about said first axis, and one of said attachment sections of said second pivot member being movable relative to the other of said attachment sections in response to movement of said handle about said second pivot axis.

2. A controller as claimed in claim 1 in which said means connecting said handle to said second pivot member comprises a third pivot member having two attachment sections and a flexural member interconnecting said attachment sections.

3. A controller as claimed in claim 2 in which one of said attachment sections of said third pivot member is connected to the other attachment section of said second pivot member, and means forming a pivotal connection between said handle and the other of said attachment sections of said third pivot member.

4. A controller as claimed in claim 3 further comprising friction clutch means resisting rotation of said handle about said pivotal connection.

5. A controller as claimed in claim 4 further comprising a strain gage on each of said flexural members.

6. A controller comprising a support frame and a handle, first, second and third pivot means forming first, second and third pivot axes, respectively, said first pivot means being connected to said frame, said second pivot means being connected to said first pivot means, said third pivot means being connected to said second pivot means, and means connecting said handle to said third pivot means for movement about a fourth pivot axis, said third and fourth pivot axes being parallel to each other, and said first pivot axis intersecting said third pivot axis.

7. A controller comprising a support structure and a handle, a flexural member connected to said support structure, means connecting said handle to said flexural member at a position spaced across said flexural member from said support structure, a bending-responsive member attached to said flexural member to detect the amount of bending of said flexural member in response to movement of said handle relative to said support structure, a fluid damper comprising rigid wall means forming two recesses separated by a rigid partition, two movable wall means associated with said rigid wall means to make each of said recesses an enclosed variable volume chamber, a restricted passage in said rigid partition interconnecting said chambers, and means connecting said handle to one of said movable walls to resist rapid movement of said handle.

8. A controller as claimed in claim 7 in which said movable walls are movable along substantially straight lines, and said straight lines are coaxial.

9. A controller as claimed in claim 7 in which said movable walls are movable along substantially straight lines, and said straight lines are off-set from each other.

10. A controller as claimed in claim 7 in which said movable walls are movable along substantially straight lines, said straight lines being parallel to each other, and said movable walls being positioned side by side.

11. A controller as claimed in claim 7 further comprising spring means biasing said two movable wall means in opposite directions whereby said movable wall means tend to return to a centered position when displaced therefrom.

12. A controller as claimed in claim 7 further comprising a spring, and connecting means between said spring and said handle for causing said spring to resist all movement of said handle which will cause movement of said one wall in either direction along said straight line.

13. A controller as claimed in claim 12 in which said spring is compressed by movement of said one wall in either direction along said straight line.

14. A controller comprising a support frame and a handle, four pivot members each comprising two coaxial cylindrical attachment sections and a flexural member interconnecting said attachment sections, means rigidly connecting one of the attachment sections of two of said pivot members to said support frame with said two members coaxially aligned, a mounting block connected to the other attachment section of each of said two pivot members, a third one of said pivot members having one of its attachment sections connected to said mounting block with the axis of said third pivot member at right angles to the axes of said two pivot members, a first pivot arm member connected to the other attachment section of said third pivot member, said fourth pivot member having one of its attachment sections connected to said first pivot arm member with the axis of said fourth pivot member at right angles to the axes of said third and said two pivot members, a second pivot arm connected to the other attachment section of said fourth pivot member, and means pivotally connecting said handle to said second pivot arm member on a pivot axis which is parallel to the axis of said fourth pivot member.

15. A controller as claimed in claim 14 in which said first pivot arm member has a portion thereof adjacent said mounting block, a lockout post rotatably journalled in said mounting block, a lockout pin projecting outwardly from said post, a recess in the side of said mounting block to receive said pin when said post is turned in one direction, said pin being of sufficient length to project outwardly from said mounting block when said post is turned from said one direction, and said first pivot arm member having a slot therein in which said pin is received when said post is turned from said one direction.

16. A controller as claimed in claim 15 further comprising a first fluid damper connected between said first and second pivot arm members, a second fluid damper connected between said first pivot arm member and said mounting block, and a third fluid damper connected between said mounting block and said support frame.

17. A controller as claimed in claim 16 further comprising bending-responsive members attached to said flexural members to detect the amount of bending of said flexural members in response to movement of said handle.

18. A controller comprising a handle, a mounting member, pivot means connected to said mounting member, attachment means connecting said handle to said pivot means, said attachment means having a portion thereof movable across the side of said mounting member when said handle is moved about said pivot means, a lockout post rotatably journalled into said mounting member, a lockout pin projecting outward from said post, a recess in the side of said mounting member to receive said pin when said post is turned in one direction, said pin being of sufficient length to project outwardly from said mounting member when said post is turned from said one direction, and said attachment means having a slot in the portion thereof which is movable across the side of said mounting member, and said pin being receivable in said slot when said post is turned from said one direction.

19. A spring centering construction comprising an actuating rod, an elongated shell surrounding said rod, a coil spring surrounding said rod within said shell, two abutment sleeves slidingly mounted along said rod and engaged by opposite ends of said spring, said casing having an enlarged internal diameter portion in which said sleeves are received, means forming two enlarged diameter shoulders fixed in spaced positions along said rod in abutment with said sleeves, said shoulders being of sufficiently small diameter to be able to move into and out of said enlarged recess in said casing, and said abutment sleeves being of too large a diameter to move out of said enlarged diameter recessed in said casing.

20. A fluid damper comprising rigid wall means forming two recesses separated by a rigid partition, two movable wall means associated with said rigid wall means to make each of said recesses an enclosed variable chamber, a restricted passage interconnecting said chambers, spring means for biasing said movable walls toward a centered position, said spring means comprising two coil springs each urging one of said movable walls into its respective chamber, an actuating rod attached to one of said movable walls, an elongated shell surrounding said rod, a coil spring surrounding said rod within said shell, two abutment sleeves slidingly mounted along said rod and engaged by opposite ends of said spring, said casing having an enlarged internal diameter portion in which said sleeves are received, means forming two enlarged diameter shoulders fixed in spaced positions along said rod in abutment with said sleeves, said shoulders being of sufficiently small diameter to be able to move into and out of said enlarged recess in said casing, and said abutment sleeves being of too large a diameter to move out of said enlarged diameter recessed in said casing.

References Cited by the Examiner
UNITED STATES PATENTS

| | | | |
|---|---|---|---|
| 1,273,059 | 7/1918 | Hild | 188—98 |
| 3,011,739 | 12/1961 | Boyce et al | 244—83.2 |
| 3,017,142 | 1/1962 | Rossire | 244—83.2 |
| 3,229,511 | 1/1966 | Rossire | 73—88.5 |

FRED C. MATTERN, Jr., *Primary Examiner.*

W. S. RATLIFF, *Assistant Examiner.*